Aug. 19, 1952     R. J. TAYLOR     2,607,150
SPEAR
Filed Nov. 14, 1947
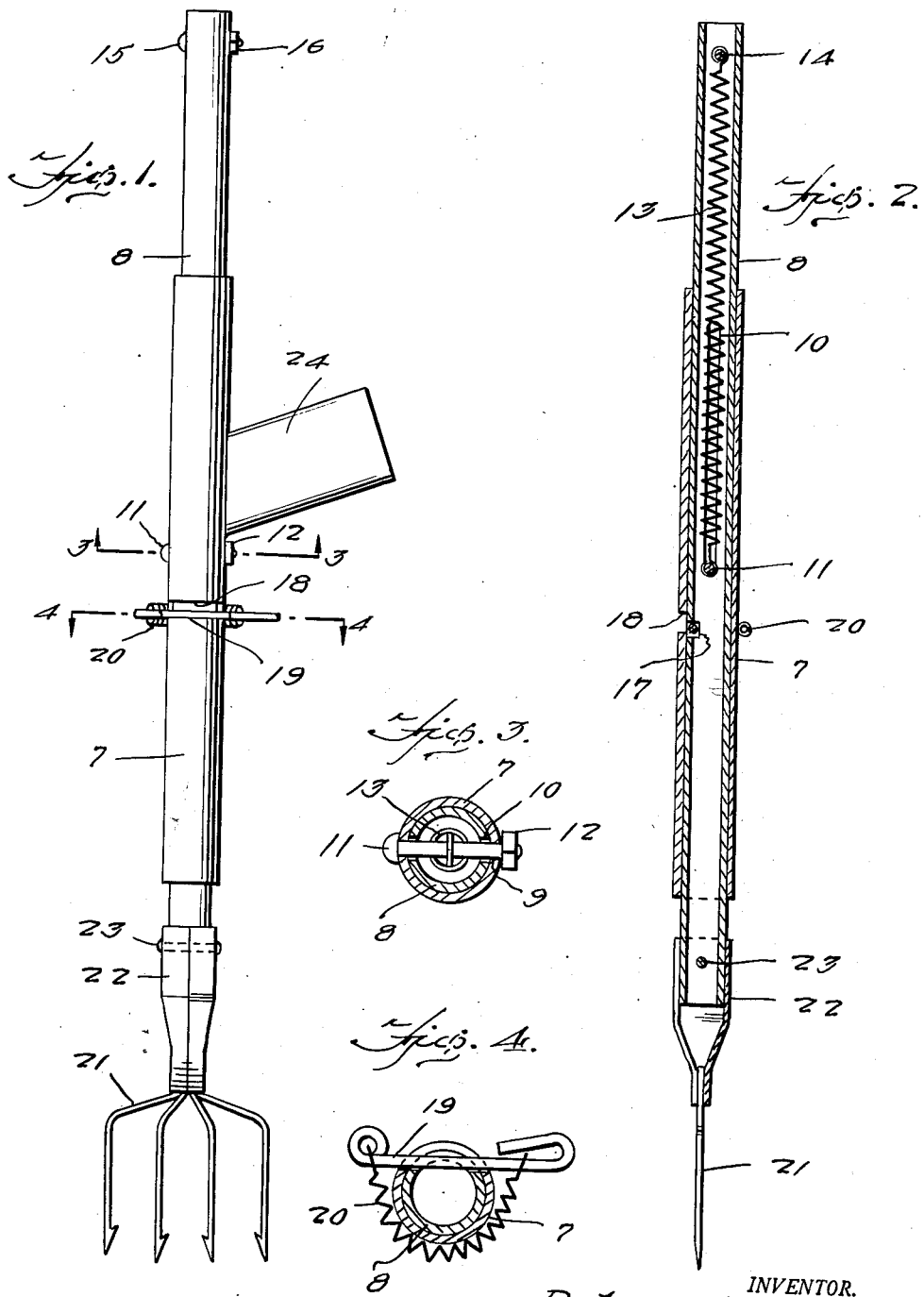
INVENTOR.
Robert J. Taylor
BY
McMorrow, Berman & Davidson
ATTORNEYS Patented Aug. 19, 1952

2,607,150

UNITED STATES PATENT OFFICE 2,607,150

SPEAR

Robert J. Taylor, Brookhaven, Ga.

Application November 14, 1947, Serial No. 786,076

1 Claim. (Cl. 43—6)

This invention relates to a spear or gig for the purpose, particularly, of capturing water creatures such a fish, frogs, etc.

An object of the invention is to provide a spear of this kind comprising a smooth, swift trigger action.

Another object is to provide such a device having a minimum of parts, making for low cost, efficient manufacture, durability and ease of operation.

These and other objects are attained by the means described herein and illustrated in the accompanying drawings, in which:

Figure 1 is an elevational view of my invention in operative condition.

Figure 2 is a longitudinal cross-section of the same.

Figure 3 is a cross-sectional view on line 3—3 of Figure 1 with the handle omitted.

Figure 4 is a partial cross-sectional view on line 4—4 of Figure 1.

In greater detail and with reference to the drawings, my device comprises a tube 7, preferably of light, strong, rust-proof metal, such as aluminum, having positioned therein a second tube 8 of similar material, projecting, as here shown, beyond both ends of tube 7 and in slide-fit relation with said tube. The tube 7 is provided with a pair of oppositely-disposed perforations 9, and the inside tube 8 with a pair of oppositely-disposed, elongated slots 10 (see Figures 2 and 3). An end-threaded bolt 11 passes through said perforations and slots, and limits sliding movement of tube 8 relative to tube 7. A nut 12 on the outer end of bolt 11 secures the latter in place.

A spring 13, positioned interiorly of tube 8, has one end secured to the bolt 11 and the other end secured at 14, Figure 2, adjacent an end of said tube, as by a bolt 15 and nut 16 (Figure 1). When the tube 8 is moved upwardly in tube 7, against the action of said spring, as shown in Figures 1 and 2, the tube 8 is spring-tensioned or "cocked" for quick ejection from the lower end of tube 7, to the extent permitted by the slots 10.

For holding tube 8 in the tensioned position, a trigger or retaining means is provided, comprising a pair of transverse slots 17 and 18, in the tubes 8 and 7, respectively. Said slots are adapted to be brought into registration when the tube 8 is moved to tensioned position, and such position is maintained, as here disclosed, by means of a trigger member, or pin 19, extending transversely through the registered slots and releasably held thus by means of a coil spring 20, embracing tube 7 and its ends secured to opposite end portions of pin 19, as indicated in Figure 4. The ends of said pin may be suitably turned or rounded as shown for convenient thumb or finger contact by the operator.

The means limiting reciprocating movement of tube 8 preclude entry of the lower end of said tube into the enclosing tube 7, and said lower end is provided with a suitable sharp or pointed member 21, comprising a socket 22 receiving the lower end of tube 8 and suitably secured thereto as a rivet 23.

A handle 24 may be provided on tube 7, conveniently located related to the trigger means described, so that the user may release pin 19 from slots 9 and 10 with the thumb or finger, thus "firing" the device.

The lightness and simplicity of my device and the smooth chatterless action resulting from the slide-fit relation of the principal parts assure effective use of the spear.

What is claimed is:

A fish spearing device, comprising an outer tube provided with a laterally extending handle and having a circumferentially extending slot formed therein between its ends and near the handle, an inner reciprocatory tube mounted within the outer tube and having a circumferentially extending slot formed therein between its ends and adapted for movement into communication with the first named slot, the inner tube being longer than the outer tube and extending forwardly and rearwardly beyond same and having a longitudinal slot, a transverse pin secured to the outer tube and extending through the longitudinal slot of the inner tube, a transverse pin secured to the rear end of the inner tube, a retractile coil spring arranged within the inner tube and connected at its ends with said pins, and a trigger pin movable laterally into and out of the circumferentially extending slots, a retractile coil spring extending circumferentially about the outer tube and having its ends attached to the trigger pin near the ends of the trigger pin, and fish spearing means secured to the forward end of the inner tube.

ROBERT J. TAYLOR.

REFERENCES CITED

The following references are of record in the file of this patent:

UNITED STATES PATENTS

| Number | Name | Date |
|---|---|---|
| 690,945 | Gray | Jan. 14, 1902 |
| 784,747 | Lobit | Mar. 14, 1905 |
| 895,126 | Thomson | Aug. 4, 1908 |
| 1,171,440 | Immell | Feb. 15, 1916 |
| 1,297,344 | Glass | Mar. 18, 1919 |
| 1,324,829 | Kornis | Dec. 16, 1919 |
| 1,506,068 | Lange | Aug. 26, 1924 |
| 1,934,801 | Hiner | Nov. 14, 1933 |